Patented Aug. 27, 1946

2,406,624

UNITED STATES PATENT OFFICE 2,406,624

PROCESS OF MANUFACTURING INVERTASE PREPARATIONS

Carl A. Neuberg, New York, and Irene S. Roberts, Fieldston, N. Y., assignors, by mesne assignments, to Sun Chemical Corporation, New York, N. Y., a corporation of Delaware No Drawing. Application February 8, 1943, Serial No. 475,178

5 Claims. (Cl. 195—66)

This invention relates to solid, dry and stable invertase preparations and to processes of manufacturing the same.

Liquid products containing the enzyme invertase are used in certain industries for inverting cane sugar into fructose and glucose. It has been suggested to prepare said liquid invertase preparations by autolysis or liquefaction of cells containing invertase, especially brewer's yeast.

According to the known processes a solution of invertase, substantially freed of cells, is prepared from autolysed yeast by various methods, such as dialysis, desalbumination, adsorption, elutriation. The resulting invertase solution is commonly stabilized with certain preservatives, such as glycerin.

R. Albert, E. Buchner and R. Rapp have described a method of preparing a dry yeast preparation by treating bottom yeast with acetone (E. and H. Buchner and M. Hahn, "Die Zymasegaerung," Munich, 1903, p. 266.)

The method mentioned above comprises treating brewer's yeast with acetone, subsequently drying the product. By using the resulting preparation, known under the name "Zymin" the authors obtained a fermentation of saccharose, thus proving that their product contained some invertase.

However, it is a well known fact that yeast dried with acetone loses its efficacy shortly, and cannot be conserved. The same holds true for yeast dried with alcohol and ether (Buchner, "Die Zymasegaerung," l. c., p. 259). There the author points out that invertase especially becomes ineffective by drying the yeast in the described manner.

The sensitivity of invertase to alcohols has long been known (A. Meyer, Enzymologie, Heidelberg, 1882, p. 79; see also, C. O'Sullivan and F. W. Thomson, J. Chem. Soc. 57, 834 and 927, 1890; E. Salkowski, Z. fuer physiol. Chem. 31, 307, 1900; C. S. Hudson and H. S. Paine, J. Am. Chem. Soc. 32, 1350, 1900; Sestri and co-workers, J. of Indian Inst. of Science XI (A), part 1, p. 1, 1928; H. Willstaetter, "Ueber Enzyme," Berlin, 1928, pp. 596 and 776.) Willstaetter also emphasizes in his book (pp. 572–3) that invertase will be destroyed by acetone.

Methods relating to the production of solid invertase preparations, such methods consisting of the treatment of yeast with certain alcohols, have been disclosed by Wallerstein (U. S. Patent No. 1,990,505.)

It is an object of this invention to manufacture solid, dry and stable invertase preparations from raw materials containing invertase, e. g. yeast, by submitting said raw materials to a dehydration treatment by which any damage to the invertase is avoided.

It is a further object of this invention to perform a quick dehydration of the starting material by first partly mechanically dehydrating the same, for instance, by pressing the yeast and afterwards using an excess of certain neutral ethers mixable with water for dehydration, thereby avoiding any autolysis of the starting material.

This method is superior to other processes known before. This new process is very simple and the resulting products are of highest value.

Ethers suitable to be used according to this invention comprise: 1,3 dioxane (m-dioxane); 1,4 dioxane (p-dioxane); dioxelane; dimethyl dioxane. The latter substance not being sufficiently soluble in water, it must be mixed with small amounts of glycol such as ethyleneglycol, propyleneglycol, trimethyleneglycol, propanetriol, and so forth.

Mixtures of dioxane with ordinary ethylether can likewise be used if applied in such proportions that the addition of about 10% water will not effect separation in layers. A suitable proportion will be one part of dioxane with one part diethylether. These dehydrating solvents will be recovered in a very simple way by suction or centrifugation or filter pressing of the invertase preparation.

The resulting invertase preparation is dried over calcium chloride and paraffine, preferably in vacuo. It does not contain more than 2.3% of water and has the full inverting power of the applied yeast. This preparation is dry, whereas well pressed yeast contains about 70–73% of water. A certain amount of the new products according to this invention is much more active than an equal amount of the raw material. Invertase preparations obtained by the dioxane method can be kept indefinitely. The efficacy of such a preparation has been found to be unimpaired after having been kept for more than 18 months.

By using completely neutral ethers according to this invention, any destructive action of the hydroxyls of the alcohol- and the carbonyl group of acetone on the starting material is avoided. An invertase preparation obtained according to this invention by using dioxane is almost insensitive against acetone after drying. The zymatic system is no longer effective. Therefore, the new preparation does not produce alcoholic fermentation.

The method described above comprising the treatment of certain raw materials, e. g. with dioxane, is applicable to all micro-organisms and plant cells containing invertase; for instance, the various species of Aspergilli, Fusaria, Monilia, Mucorales, Penicillia, thermobacterium-mobile, Torula, and dried leaves of sugar beets.

*Example 1*

1 kg. of top or bottom yeast containing about 27–30% dry constituents, crumbled as much as possible, is introduced at room temperature into 5–6 liters of anhydrous dioxane under stirring, this stirring being continued for 10 minutes. Afterwards a separation of the solid parts of the mixture from the liquid is performed by filtration, suction, filter pressing or centrifugation. The residue is treated again with 2 liters of dioxane, and the mixture is stirred for 5–10 minutes, then filtered in any convenient manner. The solid residue is washed, preferably directly (on the Buchner funnel or in a centrifuge) with 1 liter dioxane containing no water, and then dried in vacuo at room temperature over $CaCl_2$ and paraffine. Washing with anhydrous ether after the last dioxane treatment will expedite the drying. Yield: about 300 g. A white porous mass is obtained which can easily be finely pulverized. The invertase will keep stable indefinitely, when stored dry.

*Example 2*

10 g. of *Aspergillus oryzae*, centrifuged, washed and partially dried on clay in the desiccator, are gradually added to 60 ccm. of anhydrous dioxane. After stirring for 15 minutes, the material is centrifuged, treated again for 10 minutes with 30 ccm. dioxane under stirring, centrifuged again. The residue is washed in the centrifuge with 20 ccm. anhydrous dioxane. The preparation is dried in the same manner as the preparation obtained from yeast, as described in Example 1. Yield: 7 g.

The activity of the products (measured by hydrolysis of the saccharose) is high.

We have described preferred embodiments of this invention, but it will be understood that various changes will be made without departing from the scope of this invention.

What we claim is:

1. The process of manufacturing solid, dry and stable invertase preparations, which consists in submitting a raw material containing invertase of the group consisting of yeast and the fungus *Aspergillus oryzae* to thorough dehydration, by treating said partly mechanically dehydrated starting materials with neutral ethers mixable with water, of the group consisting of m-dioxane, p-dioxane, dioxolane, dimethyl dioxane and mixtures of dioxane with ethyl ether; said ethers being applied repeatedly in a substantial excess sufficient to insure quick dehydration of said raw materials, thereby avoiding any autolysis of the starting materials; removing said ethers, together with the water absorbed by the same; drying the residue and pulverizing the same.

2. The process of manufacturing solid, dry and stable invertase preparations, which consists of treating pressed yeast for 10 to 15 minutes with ethers mixable with water of the group consisting of m-dioxane, p-dioxane, dioxalane, dimethyl dioxane and mixtures of dioxane with ethyl ether; said ethers being applied in an amount corresponding to five to six times the weight of the yeast, thereby avoiding any autolysis of the yeast; removing said ethers, together with the water absorbed by the same, drying the residue and pulverizing the same.

3. The process of manufacturing solid, dry and stable invertase preparations, which consists of treating *Aspergillus oryzae* for 10 to 15 minutes with ethers mixable with water of the group consisting of m-dioxane, p-dioxane, dioxolane, dimethyl dioxane and mixtures of dioxane with ethyl ether; said ethers being applied in an amount corresponding to five to six times the weight of the *Aspergillus oryzae*, thereby avoiding any autolysis of the starting material; removing said ethers, together with the water absorbed by the same, drying the residue and pulverizing the same.

4. The process of manufacturing a solid, dry and stable product containing invertase which comprises the following steps: (a) introduction of crumbled yeast of about 27–30% dry contents at room temperature in an amount of waterfree dioxane corresponding to from 5–6 times the weight of the yeast, under continuous stirring, (b) stirring the mixture for approximately 10 minutes, (c) removing the treating liquid by filtration, filter-pressing, centrifugation, (d) treating the residue again with an excess of waterfree dioxane and separating the solid material from the treating liquid, (e) washing the solid residue with waterfree dioxane, (f) drying the solid material in vacuo at normal temperature, (g) washing the material with ether.

5. The process of manufacturing a solid, dry and stable product containing invertase which comprises the following steps: (a) centrifuging, washing and partially drying of *Aspergillus oryzae*, (b) gradually introducing said partially dried material in an amount of waterfree dioxane corresponding to from 5–6 times the weight of the starting material, (c) stirring the mixture for approximately 15 minutes, (d) removing the treating liquid by centrifugation, (e) treating the residue again with an excess of waterfree dioxane under stirring for about 10 minutes, (f) removing the treating solution, (g) washing the solid residue with waterfree dioxane, (h) drying the solid material in vacuo at normal temperature, (i) washing the material with ether.

CARL A. NEUBERG.
IRENE S. ROBERTS.